United States Patent [19]

Stapp

[11] 4,402,921
[45] Sep. 6, 1983

[54] AMMONIUM CARBONATE AND/OR BICARBONATE PLUS ALKALINE CHLORATE OXIDANT FOR RECOVERY OF URANIUM VALUES

[75] Inventor: Paul R. Stapp, Bartlesville, Okla.

[73] Assignee: Phillips Petroleum Company, Bartlesville, Okla.

[21] Appl. No.: 208,716

[22] Filed: Nov. 20, 1980

[51] Int. Cl.$^3$ .............................................. C22B 60/02
[52] U.S. Cl. .......................................... 423/17; 423/3
[58] Field of Search ................... 423/3, 15, 17; 299/5, 299/4

[56] References Cited

U.S. PATENT DOCUMENTS

| | | | |
|---|---|---|---|
| 3,017,241 | 1/1962 | Chalmers | 423/17 |
| 3,036,881 | 5/1962 | Clifford | 423/3 |
| 4,200,337 | 4/1980 | Jackovitz et al. | 423/17 X |

OTHER PUBLICATIONS

Merritt, Robert C., "The Extractive Metallurgy of Uranium", Colorado School of Mines Research Institute, 1971, pp. 83–84, 98–112.

*Primary Examiner*—Benjamin R. Padgett
*Assistant Examiner*—Matthew A. Thexton

[57] ABSTRACT

In accordance with the present invention, uranium values are extracted from materials containing uranium in valence states lower than its hexavalent state by contacting the materials containing uranium with an aqueous alkaline leach solution containing an alkaline chlorate in an amount sufficient to oxidize at least a portion of the uranium in valence states lower than its hexavalent state to its hexavalent state. In a further embodiment of the present invention, the alkaline leach solution is an aqueous solution of a carbonate selected from the group consisting of ammonium carbonate, ammonium bicarbonate and mixtures thereof. In yet another embodiment of the present invention, at least one catalytic compound of a metal selected from the group consisting of copper, cobalt, iron, nickel, chromium and mixtures thereof adapted to assure the presence of the ionic species $Cu^{++}$, $Co^{++}$, $Fe^{+++}$, $Ni^{++}$, $Cr^{+++}$ and mixtures thereof, respectively, during the contacting of the material containing uranium with the alkaline leach solution and in an amount sufficient to catalyze the oxidation of at least a portion of the uranium in its lower valence states to its hexavalent state, is present.

14 Claims, 5 Drawing Figures

A □ =2.3% $(NH_4)_2CO_3$, 1.8% $NH_4OH$, 0.5% $NaClO_3$
B ○ =15% $H_2SO_4$, 0.5% $NaClO_3$
C ● =2% $(NH_4)_2CO_3$, 0.5% $NaClO_3$
D △ =2% $NH_4HCO_3$, 0.5% $NaClO_3$
E ■ =5% $H_2SO_4$, 0.5% $NaClO_3$
F + =1% $NH_4HCO_3$, 0.5% $NaClO_3$
G × =1% $(NH_4)_2CO_3$, 0.5% $NaClO_3$
H ▲ =2% $Na_2CO_3$, 0.5% $NaClO_3$

○ = 2% NH₄HCO₃, 0.5% NaClO₃, 0.1% CuSO₄                                pH = 8.0
□ = 2% NH₄HCO₃, 0.5% NaClO₃, 0.1% Cu(NO₃)₂                              pH = 8.0
× = 2% (NH₄)₂CO₃, 0.5% NaClO₃, 0.1% CuSO₄                               pH = 7.9
● = 2.4% (NH₄)₂CO₃, 0.5% NaClO₃, 0.1% CuSO₄, 1.7% NH₄OH                pH = 9.7

AMMONIUM CARBONATE AND/OR BICARBONATE PLUS ALKALINE CHLORATE OXIDANT FOR RECOVERY OF URANIUM VALUES

BACKGROUND OF THE INVENTION

The present invention relates to the extraction of uranium values from uranium-containing materials. In a more specific aspect, the present invention relates to the extraction of uranium values from uranium-containing materials by the use of a leaching solution. Still more specifically, the present invention relates to the extraction of uranium values from mined ores or in situ from subsurface formations by the use of an aqueous alkaline leach solution containing an oxidant and, optionally, a catalytic material.

The importance of uranium as a source of energy is well established. Uranium occurs in a wide variety of subterranean strata such as granites and granitic deposits, pegmatites and pegmatite dikes and veins, and sedimentary strata such as sandstones, unconsolidated sands, limestones, etc. However, very few subterranean deposits have a high concentration of uranium. For example, most uranium-containing deposits contain from about 0.01 to 1 weight percent uranium, expressed as $U_3O_8$ as is conventional practice in the art. Few ores contain more than about 1 percent uranium and deposits containing below about 0.1 percent uranium are considered so poor as to be currently uneconomical to recover unless other mineral values, such as vanadium, gold and the like, can be simultaneously recovered. However, in most cases, concentrations of the latter materials are too low to improve the economics to any great extent and techniques for recovering the uranium often are not well adapted to the recovery of other valuable minerals.

There are several known techniques for extracting uranium values from uranium-containing materials. One common technique is roasting of the ore, usually in the presence of a combustion supporting gas, such as air or oxygen, and recovering the uranium from the resultant ash. However, the present invention is directed to the extraction of uranium values by the utilization of aqueous leaching solutions. There are two common leaching techniques for recovering uranium values, which depend primarily upon the accessibility and size of the subterranean deposit. To the extent that the deposit cotaining the uranium is accessible by conventional mining means and is of sufficient size to economically justify conventional mining, the ore is mined, ground to increase the contact area between the uranium values in the ore and the leach solution, usually less than about 14 mesh but in some cases, such as, limestones, to nominally less than 325 mesh, and contacted with an aqueous leach solution for a time sufficient to obtain maximum extraction of the uranium values. On the other hand, where the uranium-containing deposit is inaccessible or is too small to justify conventional mining, the aqueous leach solution is injected into the subsurface formation through at least one injection well penetrating the deposit, maintained in contact with the uranium-containing deposit for a time sufficient to extract the uranium values and the leach solution containing the uranium, usually referred to as a pregnant solution, is produced through at least one production well penetrating the deposit.

The most common aqueous leach solutions are either aqueous acidic solutions, such as sulfuric acid solutions, or aqueous alkaline solutions, such as sodium carbonate and/or bicarbonate.

While aqueous acidic solutions are normally quite effective in the extraction of uranium values and act quite rapidly in the extraction of the uranium values, the volumes of acid consumed are usually quite high, thus making the use of aqueous acidic solutions relatively expensive. In addition, aqueous acidic solutions generally cannot be utilized to extract uranium values from ores or in situ from deposits containing high concentrations of acid-consuming gangue, such as limestone. On the other hand, aqueous alkaline leach solutions are either not as effective in the extraction of uranium values and/or extract the uranium values at a rate which is too slow to be economically justified.

The uranium values are conventionally recovered from acidic leach solutions by techniques well known in the mining art, such as direct precipitation, selective ion exchange, liquid extraction, etc. Similarly, pregnant alkaline leach solutions may be treated to recover the uranium values by contact with ion exchange resins, precipitation, as by adding sodium hydroxide to increase the pH of the solution to about 12, etc.

As described to this point the extraction of uranium values is dependent strictly upon the economics of mining versus in situ extraction and the relative costs of acidic leach solutions versus alkaline leach solutions. However, this is an oversimplification, to the extent that only uranium in its hexavalent state can be extracted in either acidic or alkaline leach solutions. While some uranium in its hexavalent state is present in mined ores and subterranean deposits, the vast majority of the uranium is present in its valence states lower than the hexavalent state. For example, uranium minerals are generally present in the form of uraninite, a natural oxide of uranium in a variety of forms such $UO_2$, $UO_3$, $UO.U_2O_3$ and mixed $U_3O_8$ ($UO_2.2UO_3$), the most prevalent variety of which is pitchblende containing about 55 to 75 percent of uranium as $UO_2$ and up to about 30 percent uranium as $UO_3$. Other forms in which uranium minerals are found include coffinite, carnotite, a hydrated vanadate of uranium and potassium having the formula $K_2(UO_2)_2(VO_4)_2.3H_2O$, and uranites which are mineral phosphates of uranium with copper or calcium, for example, uranite lime having the general formula $CaO.2UO_3.P_2O_5.8H_2O$. Consequently, in order to extract uranium values from mined ores and subsurface deposits with aqueous acidic or aqueous alkaline leach solutions, it is necessary to oxidize the lower valence states of uranium to the soluble, hexavalent state. It has heretofore been suggested that air, oxygen and other known oxidants be added to the leach solution in order to accomplish the oxidation of the uranium to its hexavalent state. Obviously, a major factor in the utilization of oxidants in leach solutions is the cost of the oxidant itself. While air would appear to be the least expensive oxidant to utilize, certain difficulties are encountered, to the extent that insufficient air can be dissolved in the leach solution at atmospheric pressure thereby rendering the extraction process rather inefficient. While adding air to the leach solution under pressure will obviously increase the volume of air available for oxidation and improve the ultimate recovery of uranium values and the rate of recovery, the compression equipment necessary, for example, to add air under pressure of about 1000 to 2000 psi or higher for ore leaching or in situ extraction, necessarily adds to the cost of the operation. Of the other known oxidants which have been suggested in the prior art, the oxidant itself becomes a major cost factor. For example, stoichiometric quantities of most of the prior art oxidants range anywhere from about 10 to 80 pounds or more of oxidant per ton of ore treated. However, even aside from cost, the utilization of oxidants in leach solutions has a number of other drawbacks. For example, the relative effectiveness of various known oxidants varies widely. Further, a number of known oxidants are unstable, decompose, are otherwise lost during use, or lose their effectiveness for one reason or another. Finally, there appears to be no certain way of predicting what materials will act as oxidants in combination with which leach solution. For example, certain oxidants useful in aqueous acidic solutions are not useful in aqueous alkaline solutions, certain oxidants which are effective with certain acids, forming an aqueous acid solution, are not effective with other acids and certain oxidants effective with certain alkaline materials, making up an alkaline leach solution, are not effective with other alkaline materials.

In order to reduce the quantity of oxidant necessary, increase the ultimate effectiveness of the oxidants and/or increase the rate of extraction of the uranium values, it has been suggested that catalytic amounts of certain materials be added to alkaline leach solutions containing oxidants. Some of these catalytic materials are themselves oxidants when utilized in stoichiometric quantities but also act as catalysts when utilized in catalytic quantities well below stoichiometric amounts. In most cases the catalytic materials are materials adapted to supply ions of metals capable of existing in high and low valence states. The latter has led to the theory that the catalyst enters into a redox reaction in which the oxidant of the leach solution oxxidizes the metal ion to its higher valence state, the metal ion in its higher valence state oxidizes the uranium and is thereby itself reduced in valence and the cycle continues with the oxidant oxidizing the catalytic ion to its higher valence state, etc. Several other theories have also been advanced to explain why a particular catalytic material or group of catalytic materials functions as a catalyst. However, none of the theories concerning the role of the catalytic materials appears to be applicable to all catalytic materials which have been found effective. Consequently, there appears to be no basis for predicting a particular material will be effective as a catalyst in an alkaline leach solution containing an oxidant. In addition, the utilization of catalytic materials is fraught with the same uncertainties as the utilization of oxidants. Specifically, materials which should be effective as catalysts in accordance with a particular theory are often ineffective, unstable in the leach solution or ineffective in combination with a particular alkaline material, a particular oxidant or a combination of a particular alkaline material and a particular oxidant.

SUMMARY OF THE INVENTION

It is therefore an object of the present invention to provide an improved method for extracting uranium values from materials containing uranium which overcomes the above mentioned problems of the prior art.

Another object of the present invention is to provide an improved method for extracting uranium values from materials containing uranium in valence states lower than its hexavalent state.

A further object of the present invention is to provide an improved method for extracting uranium values from materials containing uranium in valence states lower than its hexavalent state in which a significant amount of the uranium in its valence states lower than its hexavalent state is effectively oxidized to the hexavalent state.

Another and further object of the present invention is to provide an improved method for extracting uranium values from materials containing uranium in valence states lower than its hexavalent state in which the rate of extraction is substantially improved.

A still further object of the present invention is to provide an improved method for extracting uranium values from materials containing uranium in valence states lower than its hexavalent state in which the rate of oxidation of the uranium in valence states lower than its hexavalent state to the hexavalent state is significantly increased.

Another and further object of the present invention is to provide an improved method for extracting uranium values from materials containing uranium utilizing a highly effective alkaline leach solution.

Another object of the present invention is to provide an improved method for extracting uranium values from materials containing uranium in valence states lower than its hexavalent state in which the uranium in valence states lower than its hexavalent state is effectively and rapidly oxidized to the hexavalent state with a highly effective alkaline leach solution containing an oxidant.

A further object of the present invention is to provide an improved method for extracting uranium values from materials containing uranium in valence states lower than its hexavalent state which effectively and rapidly converts the uranium in its lower valence states to its hexavalent state with an effective combination of an alkaline solution containing an oxidant and a catalytic material which improves the effectiveness and the rate of oxidation by the oxidant.

Still another object of the present invention is to provide an improved method for extracting uranium values from materials containing uranium utilizing an alkaline leach solution having a substantially reduced consumption of the chemicals making up the leach solution.

In accordance with the present invention, uranium values are extracted from materials containing uranium in valence states lower than its hexavalent state by contacting the materials containing uranium with an aqueous alkaline leach solution containing an alkaline chlorate in an amount sufficient to oxidize at least a portion of the uranium in valence states lower than its hexavalent state to the hexavalent state. In a further embodiment of the present invention, the alkaline leach solution is an aqueous solution of a carbonate selected from the group consisting of ammonium carbonate, ammonium bicarbonate and mixtures thereof. In yet another embodiment of the present invention, at least one catalytic compound of a metal selected from the group consisting of copper, cobalt, iron, nickel, chromium and mixtures thereof adapted to assure the presence of the ionic species $Cu^{++}$, $Co^{++}$, $Fe^{+++}$, $Ni^{++}$, $Cr^{+++}$ and mixtures thereof, respectively, during the contacting of the material containing uranium with the alkaline leach solution and in an amount sufficient to catalyze the oxidation of at least a portion of the uranium in its lower valence states to its hexavalent state, is present.

DESCRIPTION OF THE PREFERRED EMBODIMENTS

Figure 1:
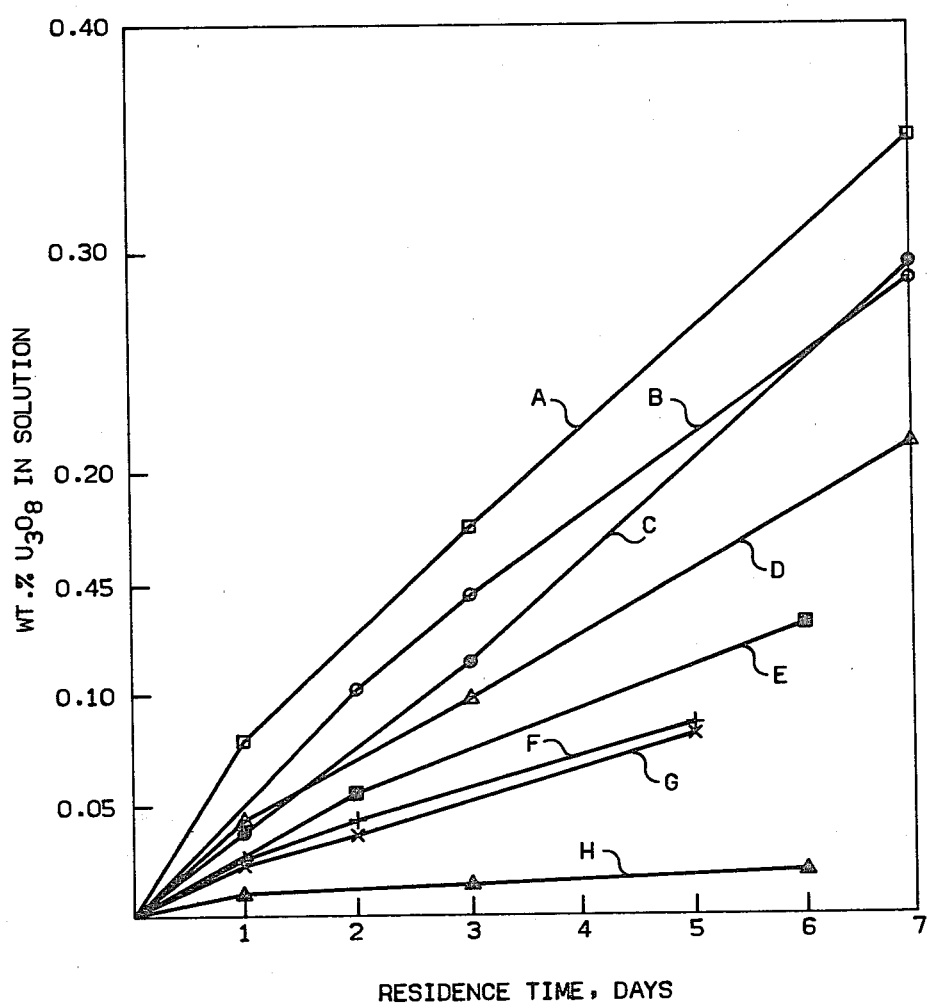
FIG. 1 is a plot showing the rate of uranium extraction with various leach solutions including one embodiment of the present invention.

When utilized in the present application and in the claims, the term "leachant" or "lixiviant" is meant to include an acid or alkaline compound whose aqueous solution is adapted to dissolve and retain in solution uranium in its soluble, hexavalent state.

When the term "alkaline" is utilized in the present application and in the claims, this term is meant to include salts having an alkali metal, an alkaline earth metal or ammonium as a cation.

When the term "solid material containing uranium" is utilized herein and in the claims, this phrase is meant to include either solid, mined ores containing uranium or subsurface deposits containing uranium.

As previously indicated in the introductory portion hereof, the prior art shows the utilization of both aqueous acidic leach solutions and aqueous alkaline leach solutions. While, as previously indicated, aqeuous acidic leach solutions are, in general, highly effective so far as percent of uranium extracted is concerned, the acid is generally more expensive than an alkaline material and comparatively larger amounts of acid are required, usually because of the presence of acid consuming gangue in the ore or subsurface deposit. As is also pointed out previously, the majority of the uranium is present in valence states lower than its hexavalent state and, therefore, an oxidant must be added to either an aqueous acidic leach solution or an aqueous alkaline leach solution in order to oxidize the uranium in its lower valence states to the soluble, hexavalent state. Previous combinations of acids and oxidants which have been suggested by the prior art include nitric acid, hydrochloric acid or sulfuric acid, particularly sulfuric acid in combination with sodium chlorate, potassium permanganate, hydrogen peroxide and manganese dioxide as oxidants. Alkaline leachants or lixiviants heretofore suggested include carbonates and/or bicarbonates of ammonium, sodium or potassium in combination with air, oxygen or hydrogen peroxide as oxidants. However, sodium carbonate and/or bicarbonate have been used almost universally in actual practice as the leachant or lixiviant. The most prevalent oxidant utilized in commercial operations is air, for economic reasons. While it has generally been found that the prior art combinations of acid and oxidant and alkaline material and oxidant will remove substantially all of the uranium from a uranium-containing material if a sufficiently long period of contact and/or a sufficiently high temperature is maintained, certain combinations of acid lixiviant and oxidant and most combinations of alkaline lixiviant and oxidant require an inordinately long period of time to effect substantially complete extraction. Stated differently, the rate at which the uranium in valence states lower than its hexavalent state is oxidized to the hexavalent state and solubilized in the aqueous leach solution is entirely too long to be practical or economical.

In accordance with the present invention it has been discovered that the rate of extraction of uranium values from a material containing uranium in valence states lower than its hexavalent state can be substantially increased by contacting the material containing uranium with an aqueous alkaline solution containing an alkaline chlorate as an oxidant. In accordance with a further embodiment of the present invention, it has been found that this rate of extraction may be further improved by contacting the uranium-containing material with an aqueous alkaline solution containing a lixiviant selected from the group consisting of ammonium carbonate, ammonium bicarbonate and mixtures thereof in combination with an alkaline chlorate as an oxidant.

EXAMPLE I

The following example illustrates the advantages of the present invention over the prior art.

Since uranium is contained in different subsurface deposits in a wide variety of different forms, since the host deposits themselves vary quite radically from one to the other and such variations are also present to some extent in a single deposit, results obtained in the leaching of uranium from ground ores or core plugs taken from a uranium deposit vary quite widely. This is further complicated by the fact that the presence of small amounts of other materials, such as other metals, radically effect the effectiveness of a leach solution, and the amount and character of these interferring materials vary widely among different deposits and within the same deposit. Consequently, it has become common practice in the art to carry out beaker tests on a substantially pure uranium compound in order to evaluate the relative effectiveness of leach solutions. More specifically, substantially pure uranium dioxide (an insoluble quadrivalent form) is mixed in an aqueous solution along with the chemicals to be utilized as a leach solution, contact is maintained for a predetermined period of time and the solution freed of solids is analyzed for uranium to determine the percent uranium removed. The rate of uranium extraction is generally determined by intervally removing aliquot portions of the solution, freeing same of solids and analyzing the solids-free solution for uranium. Since the uranium utilized in these tests is in its quadrivalent state and is substantially pure, a particular combination of lixiviant and oxidant which is ineffective or relatively poor when extracting the uranium in this form certainly will not extract uranium from solid materials containing the same. While the numerical values of the amount of uranium leached and the rate of leaching cannot be compared directly with leaching from solid materials containing uranium, such results are accurately predictive of what can be expected in actual practice and are extremely accurate in comparing the effectiveness and rate of extraction of the leach solutions.

Accordingly, the tests of the present example were the so-called beaker tests referred to above. Specifically all experiments were conducted at ambient temperature in magnetically stirred Erlenmeyer flasks which were loosely stoppered with rubber stoppers. All reagents were dissolved in distilled water, insoluble uranium dioxide was added and the contents were stirred for predetermined times. Intervally, the stirrers were turned off one hour to allow the unreacted uranium dioxide to settle and aliquots were removed by pipette, filtered through a medium porosity fritted funnel, and analyzed for soluble uranium.

In this series of tests an initial charge of 1.35 gram of uranium dioxide was mixed with 200 grams of solution. Under these circumstances, complete solution would give 0.701 weight percent of $U_3O_8$. The specific chemicals to be utilized in the leach solution are specified in FIG. 1 of the drawings as weight percent of the particular chemical. FIG. 1 graphically shows the results of these tests by plotting weight percent $U_3O_8$ in solution versus residence time in days (illustrating rate of extraction). More specifically, aliquot portions of the solution were taken at the end of a particular number of days, as shown on each plot, and the sample was analyzed for solubilized uranium. The results plotted in FIG. 1 clearly show that an alkali metal chlorate, such as sodium chlorate, is an effective oxidant in combination with an alkaine lixiviant. Even more dramatically illustrated is the fact that the rate of solubilization of uranium is substantially improved when ammonium carbonate and/or bicarbonate solution is utilized as a lixiviant in combination with an alkali metal chlorate, such as sodium chlorates, as an oxidant, as compared with the utilization of sodium carbonate solution as the lixiviant in combination with said chlorate as an oxidant. FIG. 1 also clearly shows that 1 percent ammonium carbonate or ammonium bicarbonate solution in combination with sodium chlorate as an oxidant is nearly as effective as the combination of 5 percent sulfuric acid as the lixiviant with sodium chlorate as an oxidant and 2 percent ammonium carbonate or ammonium bicarbonate solution in combination with sodium chlorate as an oxidant was substantially better than 5 percent aqueous sulfuric acid with the same amount of sodium chlorate as an oxidant. In fact, 15 percent by weight sulfuric acid as the lixiviant in combination with sodium chlorate as an oxidant is necessary in order to obtain results equivalent to those obtained by the combination of 2 percent ammonium carbonate or ammonium bicarbonate solution in combination with the same amounts of sodium chlorate as an oxidant.

As can be seen from FIG. 1 of the drawings, even with the best of the alkaline leach solutions containing sodium chlorate as an oxidant, the amount of uranium dioxide actually solubilized (extracted) at the end of the test period is relatively low and thus the time necessary to extract substantially all of the uranium would be inordinately long.

In accordance with still another embodiment of the present invention it has been found that the rate of solubilization of insoluble uranium in valence states lower than its hexavalent state can be substantially improved by adding to a leach solution containing a lixiviant selected from the group consisting of a carbonate selected from the group consisting of ammonium carbonate, ammonium bicarbonate and mixtures thereof and an alkaline chlorate oxidant, at least one catalytic compound of a metal selected from the group consisting of copper, cobalt, iron, nickel, chromium and mixtures thereof, adapted to assure the presence of the ionic species $Cu^{++}$, $Co^{++}$, $Fe^{+++}$, $Ni^{++}$, $Cr^{+++}$ and mixtures thereof, respectively, during the contacting of the uranium containing material with the leach solution and in an amount sufficient to catalyze the oxidation of at least a portion of the uranium in lower valence states to its hexavalent state.

This improvement is illustrated by the following example.

EXAMPLE II

Figure 2:
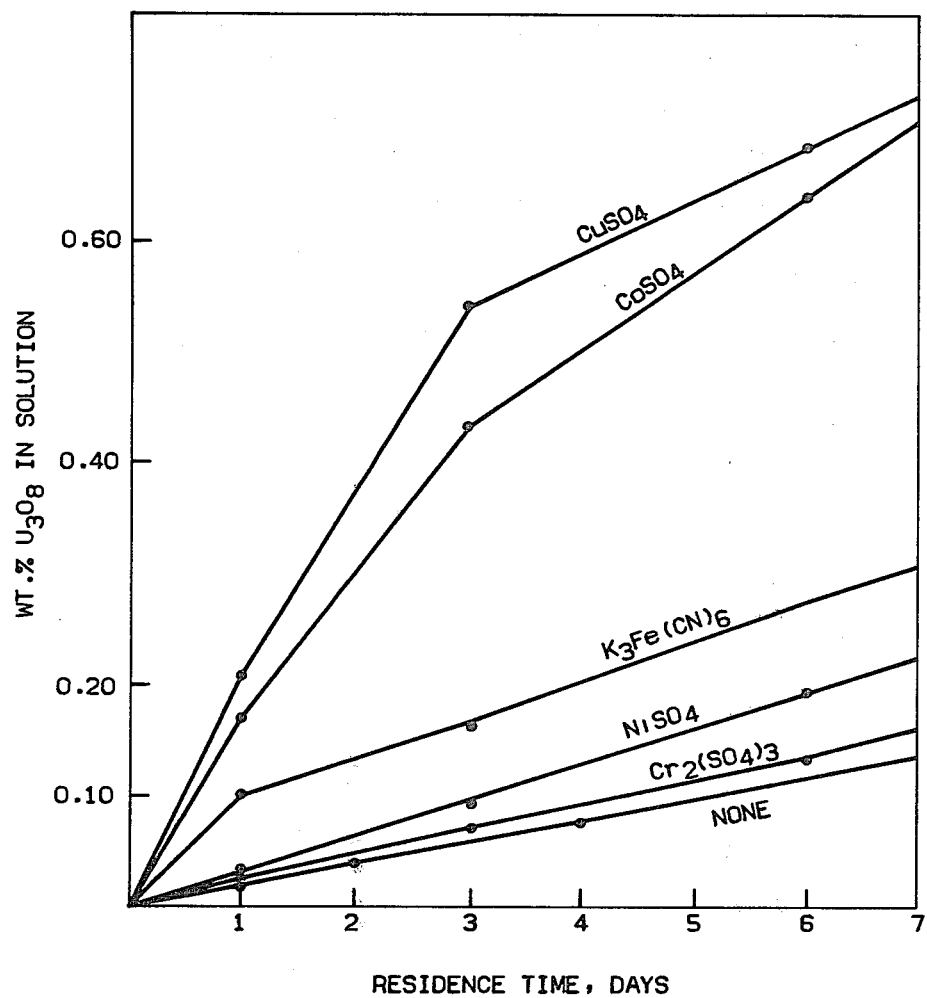
FIG. 2 is a plot showing the rate of uranium extraction with various leach solutions in accordance with another embodiment of the present invention.

This series of tests was carried out in the same manner as the tests of FIG. 1 except that 2 percent by weight ammonium carbonate solution was utilized as a lixiviant in combination with 0.5 weight percent of sodium chlorate as an oxidant and 0.1 weight percent of the metallic compounds indicated in FIG. 2 as a catalytic material. FIG. 2 plots the weight percent $U_3O_8$ solubilized by the leach solution against residence time in days in the same manner as the plot of FIG. 1. In addition to the tests carried out and plotted in FIG. 2, a test was run in which zinc sulfate was utilized as a catalytic material. However, the utilization of zinc sulfate as a catalytic material gave no measurable improvement over the run in which no catalytic material was added. Also an attempt was made to form a leach solution containing ceric salts as a catalytic material. However, stable solutions could not be prepared from the ceric salts.

The results of the test plotted in FIG. 2 show that the presence of the ionic species $Cr^{+++}$, $Ni^{++}$, $Fe^{+++}$, $Co^{++}$ and $Cu^{++}$ did improve the extraction of insoluble $UO_2$ in combination with ammonium carbonate and/or bicarbonate and sodium chlorate when utilized in catalytic amounts. Even more dramatic, however, is that the presence of $Co^{++}$ and $Cu^{++}$ improved the rate of extraction of insoluble $UO_2$ by a factor of at least two times that obtained when no catalyst material was included or when the ionic species $Cr^{+++}$, $Ni^{++}$ and $Fe^{+++}$ were utilized in catalytic amounts.

This series of tests also shows the unpredictability of the catalytic action of various materials in combination with the same lixiviant, ammonium carbonate, and the same oxidant, sodium chlorate. As indicated in the introductory portion hereof, the generally accepted theory of the action of catalytic materials in alkaline leach solutions is that a redox reaction occurs involving the metallic ions of the catalytic material. However, if this theory is correct then ceric salts should function in the same manner as cobalt and copper salts and chromium, nickel and iron salts should be as effective as cobalt and copper salts. The example, however, shows the contrary. In line with this theory, the metal ions should also be in their higher valence states. However, FIG. 2 shows that cobalt in its lower valence state is just as effective as copper in its higher valence state and nickel in its lower valence state is more effective than chromium and almost as effective as iron in their higher valence states. The inability to obtain any results from cerium in its higher valence state is also contrary to this theory. Superficially, it would appear from the tests shown in FIG. 2 that ionic species of transition metals would be equally effective as catalytic materials. However, cerium is a transition metal and, as indicated, could not be utilized. It would also appear from the tests shown in FIG. 2 that metals which form coordination compounds would be equally effective. However zinc and cerium in addition to chromium, nickel, iron, cobalt and copper form coordination compounds, particularly with ammonia or ammonium ions, yet, as indicated, zinc and cerium were ineffective and chromium, nickel and iron were substantially less effective than cobalt and copper. While all materials capable of forming coordination compounds are not useful, it appears that the formation of coordination compounds is a factor in the usefulness of the catalyst materials of the present invention. Thus, it is clear that there is no basis for predicting the suitability of particular metallic ions as catalysts in leach solutions of an alkaline material and an oxidant and particularly in combination with an ammonium carbonate and/or bicarbonate, as a lixiviant, and an alkaline chlorate as an oxidant.

EXAMPLE III

Figure 3:
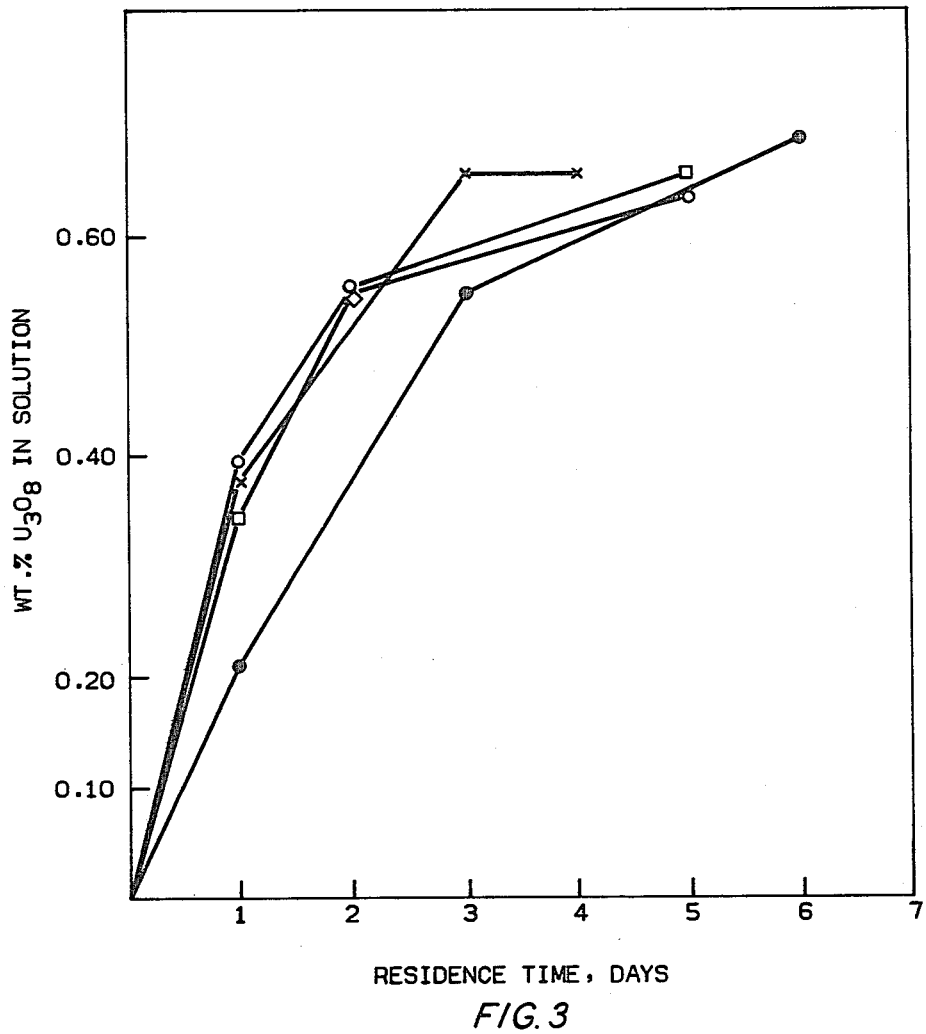
FIG. 3 is a plot showing the rate of uranium extraction with various leach solutions in accordance with a further embodiment of the present invention.

Another series of comparative tests was conducted in the same manner as the tests of Examples I and II. FIG. 3 of the drawings shows the results of this series of tests as well as the compositions and pH values of the leach solutions utilized. The plot of FIG. 3 is the same as that of FIGS. 1 and 2. As the data plotted in FIG. 3 illustrates, there is little if any difference between the utilization of ammonium carbonate and ammonium bicarbonate as lixiviants in combination with sodium chlorate as an oxidant and cupric ions as a catalyst. The data also indicate that there is little, if any, difference between the counter ions combined with cupric ions in the compound added to supply cupric ions during extraction. The data also appears to indicate that increasing the pH of the leach solution by adding ammonium hydroxide was of no benefit. In fact, it would appear that excess ammonia could be detrimental, to the extent that oxidation of the ammonium ion by sodium chlorate would lower the oxidant concentration or, alternatively, require more oxidant. Additional tests not shown in FIG. 3 indicated that there is little difference in the rate of oxidation when the ammonium carbonate concentration was decreased from 2 percent to 1 percent by weight. However, a further decrease to 0.5 percent by weight resulted in an initial rate essentially equivalent to the higher percentages of carbonate but at a certain point the conversion of uranium to its hexavalent state essentially stopped. It is believed that this termination of oxidation was probably due to complete consumption of the carbonate at that point in time.

The following example sets forth a number of tests in which various combinations of ammonium carbonate and/or bicarbonate, as a lixiviant, and various oxidants and combinations of such lixiviants with various oxidants and copper or cobalt catalysts were carried out.

EXAMPLE IV

To demonstrate operability on uranium-containing materials, a series of core runs were made in which core plugs 3 inches long and 1 inch in diameter, taken from a uranium-containing subsurface deposit, were encased in epoxy cement. At each end of the core, a $\frac{1}{4}$-inch thick Plexiglas disc containing a $\frac{1}{4}$-inch nylon Swagelock fitting was mounted. The leach solution flowed though $\frac{1}{8}$-inch Tygon tubing from a reservoir, through a peristaltic pump, through the core plug and then to a sample collection flask.

The composition of the leach solutions utilized is set forth in the following table. Each of the leach solutions contained 300 ppm NaCl and the runs were conducted with a leach solution injection rate of 0.189 cc/hr.

In addition to the chemicals added to the leach solution, the table sets forth the pH of the leach solution, the ultimate percent uranium extracted, expressed as $U_3O_8$, and the number of pore volumes of leach solution necessary to extract 25 percent, 50 percent, 70 percent and 80 percent, respectively, of the uranium content of the core. The pore volume of the cores varied between about 2.41 cc and 3.66 cc and the initial uranium content, expressed as $U_3O_8$, varied from 0.0452 to 0.435 weight percent with the majority being in the range of about 0.100 to 0.200. Obviously, while these variations in the pore volume of the cores and the uranium content will affect the ultimate results with respect to both percent uranium extracted and rate of extraction, the properties of the cores are considered to be sufficiently close to provide reasonably accurate comparative results and serve as a basis for reasonably accurate prediction of commercial results.

TABLE

| Run No. | Oxidant (Wt. %) H₂O₂ | NH₄NO₃ | Air | O₂ | NaClO₃ | Lixiviant (Wt. %) (NH₄)₂CO₃ | NH₄HCO₃ | Catalyst (Wt. %) CuSO₄·5H₂O | CoSO₄ | Solution pH | NH₄OH (Wt. %) | Uranium Extracted % | Pore Volumes To Recover 25% | 50% | 70% | 80% |
|---|---|---|---|---|---|---|---|---|---|---|---|---|---|---|---|---|
| 1 | 1.0 | | | | | | | | | 9.3 | 2.06 | 83.4 | 12.5 | 51 | 110 | 176 |
| 2 | 0.3 | | | | | | 10.0 | | | 8.25 | | 70.8 | 10 | 35 | 173 | >500* |
| 3 | 1.05 | | | | | 5.0 | 1.0 | | | 8.25 | | 54.3 | 83 | 211 | 420* | |
| 4 | 1.05 | | | | | 2.0 | 2.0 | | | 8.3 | | 54.2 | 43 | 179 | 900* | |
| 5 | | 1.0 | | | | 2.0 | | 0.1 | | 10.0 | 3.05 | 45.5 | 48 | 230* | | |
| 6 | | 1.0 | X** | | | 2.0 | | 0.1 | | 7.84 | | 35.7 | 100 | >1000* | | |
| 7 | | 1.0 | X** | | | | 2.0 | 0.1 | | 7.80 | | 26.4 | 167 | >1000* | | |
| 8 | | | | X | | | 2.0 | | | 9.3 | | 18.6 | | | | |
| 9 | | | | X | | | | | | 9.3 | | 7.96 | | | | |
| 10 | | | | | 0.5 | 2.0 | | 0.1 | | 9.63 | 1.8 | 75.9 | 41 | 134 | 325 | 440* |
| 11 | | | | | 0.5 | 2.4 | | 0.1 | | 10.4 | 3.71 | 71.2 | 18 | 84 | 225 | |
| 12 | | | | | 0.2 | | 2.0 | 0.02 | | 9.0 | | 56.3 | 104 | 308 | | |
| 13 | | | | | 0.5 | 2.0 | | 0.1 | | 10.15 | 3.09 | 51.5 | 39 | 193 | | |
| 14 | | | | | 0.5 | | | 0.1 | | 10.9 | 10.3 | 47.3 | 46 | 235 | | |
| 15 | | | | | 0.5 | | 2.0 | 0.1 | | 8.55 | | 45.5 | 48 | 230* | | |
| 16 | | | | | 0.5 | 2.0 | 2.0 | 0.1 | | 8.95 | | 43.0 | 109 | 430* | | |
| 17 | | | | | 0.5 | | 2.0 | | 0.1 | 9.65 | 1.8 | 38.3 | 142 | >1000* | | |
| 18 | | | | | 0.5 | | 1.0 | | 0.1 | 9.05 | | 37.8 | 122 | 900* | | |
| 19 | | | | | 0.5 | 1.0 | 2.0 | | | 8.3 | | 30.7 | 128 | | | |
| 20 | | | | | 0.5 | | | 0.1 | | 10.0 | 2.78 | 27.9 | 222 | | | |
| 21 | | | | | 0.5 | 2.0 | | 0.1 | | 10.15 | 3.09 | 27.5 | 146 | | | |
| 22 | | | | | 0.2 | 1.0 | | 0.02 | | 9.8 | 1.03 | 26.7 | 162 | | | |
| 23 | | | | | 0.5 | 2.0 | | 0.05 | | 10.15 | 3.09 | 21.0 | 250* | | | |
| 24 | | | | | 0.5 | | 2.0 | 0.02 | | 9.0 | | 15.3 | >1000* | | | |

*Graphically extrapolated.
**Air began halfway through run.

In order to better illustrate the comparative effectiveness of the various oxidants utilized, the runs were grouped according to the primary oxidant utilized and plotted as bar graphs showing the total cumulative recovery for each oxidant. This graph is shown as FIG. 4 of the drawings. For relation back to the above table the run numbers are indicated at their appropriate points on the bars of the graph of FIG. 4.

Figure 4:
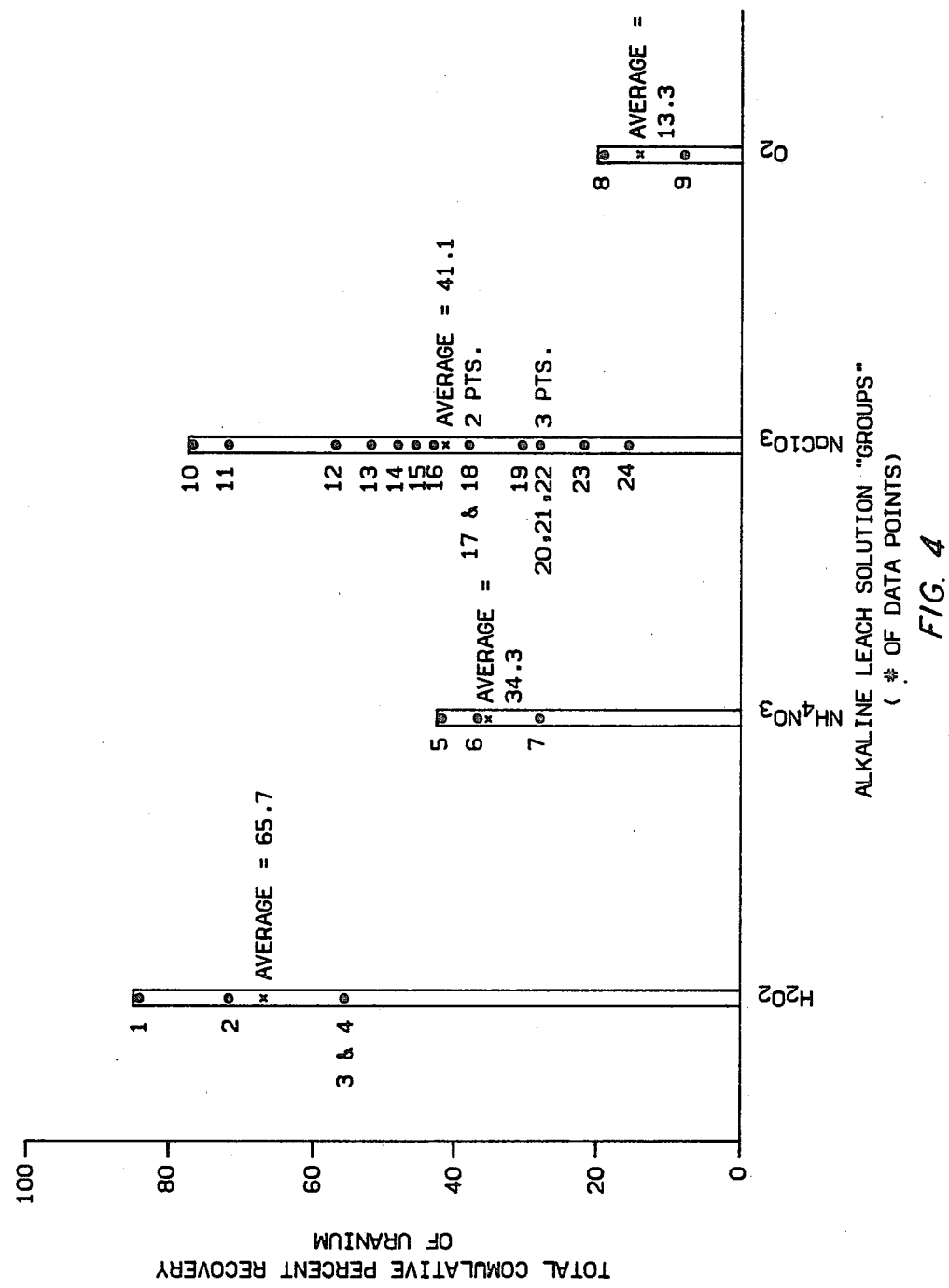
FIG. 4 is a bar graph showing the total uranium extracted by various leach solutions with different oxidizing agents.

As previously indicated, scattering of the results shown in FIG. 4 is to some extent caused by variations in the pore volume of the cores and their uranium content. In addition, it is most likely that these variations are caused by a number of other parameters such as concentrations of chemicals in the leach solution and the total number of pore volumes of solution utilized.

While FIG. 4 would indicate that hydrogen peroxide is an excellent oxidant in combination with ammonium carbonate and/or bicarbonate it should be recognized that hydrogen peroxide is quite expensive compared to other oxidants. However, of more importance was the observed decomposition of the hydrogen peroxide. In all runs with hydrogen peroxide as an oxidant, it was necessary to remake the stock leach solution every $3\frac{1}{2}$ days. Accordingly, the stock leach solution was changed at least once in all the runs. Since the products of decomposition of the hydrogen peroxide are water and oxygen it would therefore appear that the use of oxygen, as such, would be preferable from an economic standpoint.

While only two runs were made with oxygen as an oxidant and the ultimate uranium recovery was the lowest for this particular oxidant, it is to be observed that the runs were made at atmospheric pressure. It has been suggested by a number of investigators that the rate of dissolution of uranium dioxide increases linearly with the square root of the partial pressure of oxygen. Accordingly, at superatmospheric pressures the effectiveness of oxygen should be considerably higher. This is particularly significant where uranium is to be leached from a subsurface deposit by in situ extraction with a leach solution. For example, a deposit at a depth of about 3,000 ft. would be leached with a leach solution containing oxygen at a partial pressure of about 1300 psi.

While substantial scattering of the ultimate recovery data appears in both the runs utilizing ammonium nitrate and sodium chlorate as oxidants, the indicated averages are probably close to what can be expected if the previously mentioned variations between the runs were eliminated.

It should also be observed that when utilizing the combination of ammonium carbonate and/or bicarbonate, as a lixiviant, sodium chlorate or ammonium nitrate, as oxidants, and copper or cobalt, as catalysts, the concentration of lixiviant can be varied between about 1 percent and 2.5 percent, the concentration of oxidant can be varied between about 0.2 and 1 percent by weight and the catalyst concentration can be varied between about 0.02 and 0.1 weight percent without materially affecting the results.

Figure 5:
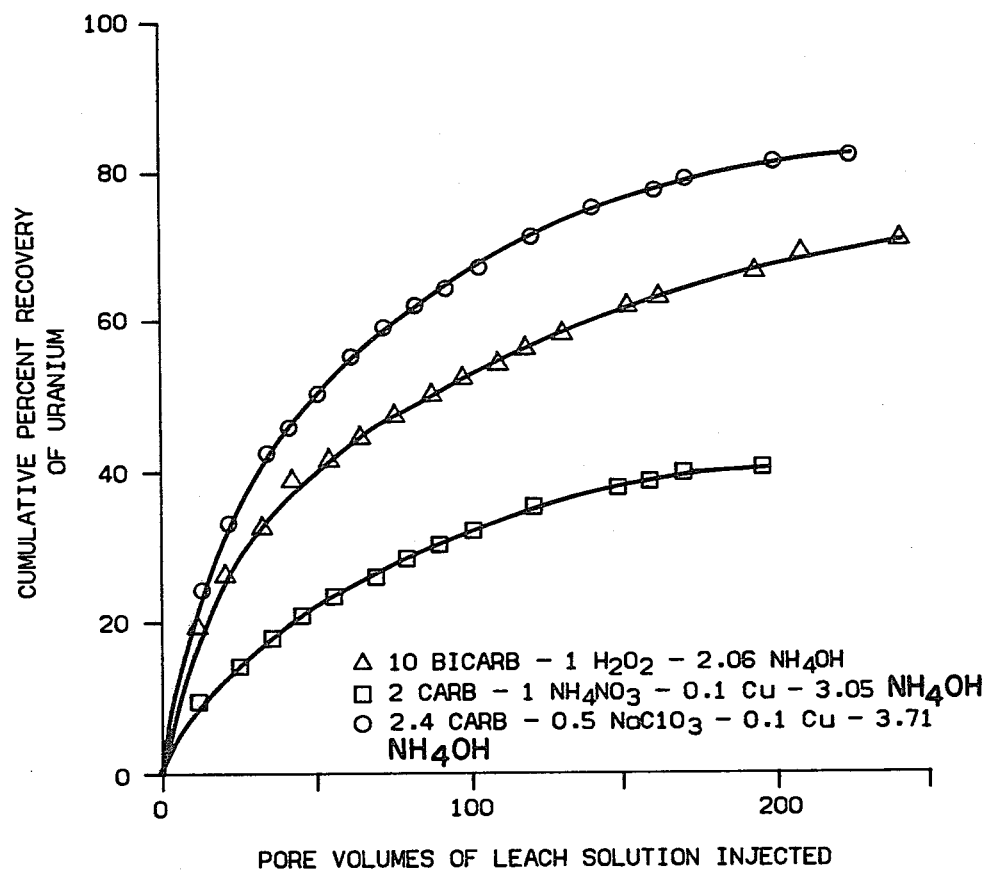
FIG. 5 is a plot showing the rate of uranium recovery for several of the best leach runs shown in FIG. 4.

In FIG. 5 of the drawings, one of the best runs out of the runs made with hydrogen peroxide, ammonium nitrate and sodium chlorate, respectively, have been plotted to show the relative rates of uranium extraction. In FIG. 5 the percent uranium extracted is plotted against pore volumes of leach solution injected into the core.

As previously indicated, the method of the present invention is useful both in the extraction of uranium values from mined ore containing uranium, as well as in the in situ extraction of uranium from subsurface deposits containing uranium. However, the method of the present invention is particularly useful for the in situ extraction of uranium from subsurface deposits since such extraction methods require large volumes of leach solution and the solutions utilized in accordance with the present invention are effective with very small amounts of chemicals. The method of the present invention is also particularly useful in extraction of uranium values from solid materials containing uranium and which also contain significant amounts of acid-consuming gangues, such as calcium carbonate and the like.

Surface leaching of mined ore containing uranium is well known in the metallurgical art. Specifically, the ore is generally ground to increase the contact area between the uranium values in the ore and the extraction solution. Usually, the grinding is accomplished by the use of ball mills or rod mills. As previously indicated, it is customary to grind the ore to particle sizes in the vicinity of $-100$ mesh and in some cases $-325$ mesh. The finely divided ore is then disposed in equipment adapted to be heated and agitated. The extraction may be carried out at atmospheric temperature or at a temperature above atmospheric temperature up to the boiling point of water. However, a mildly elevated temperature is usually utilized since extraction is usually more effective at an elevated temperature. A heated solution containing the ground ore is then agitated for a time sufficient to extract the maximum amount of uranium values from the ore. The concentration of solids in the leach solution may also vary quite widely but a workable solution usually contains between about 50 percent and 70 percent by weight of ore solids. At higher concentrations the ore leaching solution becomes too thick to be handled readily and below about 50 percent by weight of solids the volume of leach solution is too large to be economical. The contact time may also vary. In commercial practice 48 hours is usually adequate at lower temperatures with 24 hours or less at higher temperatures. At still higher temperatures and with an ore ground in very fine state the contact time may be as low as 6 hours.

The pregnant leach solution is then separated from the ore, the ore is washed with water to recover residual leach solution, usually in a countercurrent fashion, and all or part of the wash solution may be added to the leach solution for the hereinafter mentioned recycle operation. The pregnant leach solution is generally filtered to remove residual solids, treated to remove the solubilized uranium values and thereafter recycled in order to reduce the consumption of leach solution. The removal of the uranium values from the pregnant leach solution may be accomplished in various ways. For example, the uranium values may be removed by ion exchange resins. It is also conveniently removed by adding sodium hydroxide to increase the pH to about 12, at which point the uranium values precipitate to form what is known in the industry as "yellow cake". The yellow cake is then filtered from the leach solution, boiler gas from a combustion process is passed through the leach solution, the carbon dioxide being absorbed and neturalizing the caustic to thus regenerate the carbonate leach solution and lower the pH. The solution can then be recycled.

In the in situ extraction of uranium values from a subsurface deposit, the leach solution is made up in the same way as it is for the extraction of uranium values from ground ores. The leach solution is then injected into the subsurface deposit through one or more injection wells penetrating the deposit. By adjusting the pressures at which the leach solution is injected, the leach solution may be passed through the deposit continuously, by utilizing a higher injection pressure than the pressure in the formation, or maintained in the deposit for a predetermined period of time, by balancing the injection pressure and the subsurface pressure and thereafter increasing the pressure to drive the pregnant leach solution from the deposit. In order to conserve leach solution, the leach solution may be driven through the reservoir or driven from the reservoir by water, gas or any other convenient driving fluid. The pregnant leach solution is then removed from the deposit through at last one production well. Appropriate patterns of injection and production wells, injection and production techniques, techniques for preventing the loss of leach solution to formations surrounding the deposit and techniques for preventing channeling of the leach solution through more porous portions of the deposit or improving the area of the deposit contacted by the leach solution are well known in the art of secondary and tertiary recovery of oil from subsurface formations. The produced pregnant leach solution can then be treated for the recovery of solubilized uranium values in the same manner as previously described with respect to the extraction of ground ores. Also, as previously mentioned, the regenerated leach solution can be recycled, to thus further conserve the volume of leach solution used.

The concentration of alkaline lixiviant utilized in the leach solution may vary over a wide range, for example, from about 10 to about 80 grams/liter of solution or, expressed in terms of solid uranium-containing material, from about 20 to about 80 pounds per ton of solid uranium-containing material. The amount of oxidant utilized may vary from about 0.2 to about 1.5 percent by weight of the solution, preferably, between about 0.2 and about 0.5 weight percent of the leach solution. Stated differently the oxidant may vary between about the stoichiometric amount required to oxidize all of the uranium in valence states lower than its hexavalent state to the hexavalent state up to about twice the stoichiometric amount. Stated in terms of the amount of solid uranium-containing material being treated, the oxidant may range from about 10 to about 80 pounds per ton of solid material containing uranium. The amount of catalytic material to be utilized in accordance with the present invention may vary from about 0.02 to about 0.2 weight percent of the leach solution and, preferably, between 0.02 and 0.1 weight percent. On the basis of the amount of solid material containing uranium to be treated, the amount of catalyst may vary between about 0.1 and about 10 pounds per ton, with about 2 pounds per ton generally being sufficient. The pH of the leach solution may vary from about 7.5 to as high as 10.5. However, for best results this value should be maintained between about 7.5 and 9.0.

While specific materials, quantities thereof, specific conditions of operation and specific techniques have been referred to herein, it is to be understood that such specific recitals are for purposes of illustration only and are not to be considered limiting.

I claim:

1. A method for extracting uranium values from a solid material containing uranium in valence states lower than its hexavalent state comprising:
   contacting said solid material containing uranium with an aqueous alkaline leach solution selected from the group consisting of solutions of ammonium carbonate, ammonium bicarbonate and mixtures thereof and an alkaline chlorate in an amount sufficient to oxidize at least a portion of said uranium in valence states lower than its hexavalent state to its hexavalent state.

2. A method in accordance with claim 1 wherein the aqueous alkaline leach solution additionally contains at least one compound of a metal selected from the group consisting of copper, cobalt, iron, nickel, chromium and mixtures thereof adapted to assure the presence of the ionic species $Cu^{++}$, $Co^{++}$, $Fe^{+++}$, $Ni^{++}$, $Cr^{+++}$ and mixtures thereof, respectively, during the contacting of the solid material containing uranium with the aqueous alkaline leach solution and in an amount sufficient to catalyze the oxidation of at least a portion of the uranium in valence states lower than its hexavalent state to its hexavalent state.

3. A method in accordance with claim 2 wherein the ionic species $Cu^{++}$, $Co^{++}$, $Fe^{+++}$, $Ni^{++}$, $Cr^{+++}$ and mixtures thereof, respectively, are present during the contacting of the solid materials containing uranium with the alkaline leach solution in the form of at least one coordination compound.

4. A method in accordance with claim 3 wherein the ligand of the at least one coordination compound contains nitrogen.

5. A method in accordance with claim 4 wherein the ligand of the at least one coordination compound contains the ionic species $CN^-$.

6. A method in accordance with claim 4 wherein the ligand of the at least one coordination compound contains a material selected from the group consisting of the ionic species $NH_4^+$, the $NH_3$ molecule and mixtures thereof.

7. A method in accordance with claim 6 wherein the at least one coordination compound is formed during the contacting of the solid material containing uranium with the aqueous alkaline leach solution by adding to the aqueous alkaline leach solution a salt selected from the group consisting of a salt containing the ionic species $Cu^{++}$, $Co^{++}$, $Ni^{++}$, $Cr^{+++}$ and mixtures thereof, respectively.

8. A method in accordance with claim 2 wherein the metal is selected from the group consisting of copper, cobalt and mixtures thereof adapted to assure the presence of the ionic species, $Cu^{++}$, $Co^{++}$ and mixtures thereof, respectively.

9. A method in accordance with claim 7 wherein the salt containing the ionic species $Cu^{++}$ is selected from the group consisting of $CuSO_4$ and $Cu(NO_3)_2$ and the salt containing the ionic species $Co^{++}$ is $CoSO_4$.

10. A method in accordance with claim 7 wherein the salt containing the ionic species $Cu^{++}$ is $CuSO_4$ and the salt containing the ionic species $Co^{++}$ is $CoSO_4$.

11. A method in accordance with claim 7 wherein the salt containing the ionic species, $Cu^{++}$ is selected from the group consisting of $CuSO_4$ and $Cu(NO_3)_2$.

12. A method in accordance with claim 1, 2, 3, 4, 5, 6, 7, 8, 9, 10 or 11 wherein the amount of compound adapted to assure the presence of the ionic species $Cu^{++}$, $Co^{++}$, $Fe^{+++}$, $Ni^{++}$, $Cr^{+++}$ and mixtures thereof is between about 0.02 and about 0.05 weight percent of the leach solution.

13. A method in accordance with claim 1, 2, 3, 4, 5, 6, 7, 8, 9, 10 or 11 in which the solid material containing uranium is a ground, mined ore and is contacted with the aqueous alkaline leach solution for a time sufficient to oxidize a significant amount of the uranium in valence states lower than its hexavalent state to its soluble hexavalent state.

14. A method in accordance with claim 1, 2, 3, 4, 5, 6, 7, 8, 9, 10 or 11 in which the solid material containing uranium is a subsurface deposit, the aqueous alkaline leach solution is injected into said deposit and maintained in contact therewith for a time sufficient to oxidize a significant amount of the uranium in valence states lower than its hexavalent state to its soluble hexavalent state and the pregnant aqueous alkaline leach solution is thereafter removed from said subsurface deposit.

* * * * *